(12) United States Patent
Chen et al.

(10) Patent No.: US 11,989,150 B2
(45) Date of Patent: May 21, 2024

(54) INTERFACE CIRCUIT, AND METHOD AND APPARATUS FOR INTERFACE COMMUNICATION THEREOF

(71) Applicant: AUTEL INTELLIGENT TECHNOLOGY CORP., LTD., Guangdong (CN)

(72) Inventors: Huaming Chen, Guangdong (CN); Honghua Lu, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 0 days.

(21) Appl. No.: 17/658,859

(22) Filed: Apr. 12, 2022

(65) Prior Publication Data

US 2022/0327087 A1 Oct. 13, 2022

Related U.S. Application Data

(63) Continuation of application No. PCT/CN2020/120437, filed on Oct. 12, 2020.

(30) Foreign Application Priority Data

Oct. 18, 2019 (CN) .......................... 201910996120.4

(51) Int. Cl.
*G06F 13/42* (2006.01)
*G05B 23/02* (2006.01)
(Continued)

(52) U.S. Cl.
CPC .......... *G06F 13/4282* (2013.01); *G06F 13/20* (2013.01); *G06F 2213/0042* (2013.01)

(58) Field of Classification Search
CPC ................ G06F 13/4282; G06F 13/20; G06F 2213/0042; G06F 13/385; G06F 13/387;
(Continued)

(56) References Cited

U.S. PATENT DOCUMENTS 7,000,057 B1 * 2/2006 Novell .................. G06F 13/385
709/209
8,095,714 B2 1/2012 Huo et al.
(Continued)

FOREIGN PATENT DOCUMENTS

CN 101430557 A 5/2009
CN 101989246 A 3/2011
(Continued)

OTHER PUBLICATIONS

The Extended European search report dated Sep. 30, 2022; Appln. No. 20877873.8.
(Continued)

*Primary Examiner* — Idriss N Alrobaye
*Assistant Examiner* — Henry W Yu
(74) *Attorney, Agent, or Firm* — Frank Gao, Esq.

(57) ABSTRACT

This disclosure relates to the technical field of automobiles and software and discloses an interface circuit and a method and apparatus for interface communication thereof. In the interface circuit, a micro-control unit has an output interface connected to a first conversion unit connected to a USB HOST interface and a USB SLAVE interface and a second conversion unit connected to an HDMI interface, and is configured to control the first conversion unit to be set in a HOST mode to communicate with the USB HOST interface when receiving a trigger signal from the USB HOST interface, the first conversion unit to be set in an SLAVE mode to communicate with the USB SLAVE interface when receiving a trigger signal from the USB SLAVE interface, and the second conversion unit to output the TMDS signal to communicate with the HDMI interface when receiving a trigger signal from the HDMI interface.

19 Claims, 10 Drawing Sheets

(51) Int. Cl.
   *G06F 13/20* (2006.01)
   *G06F 13/38* (2006.01)
   *H04L 69/08* (2022.01)
   *H04L 69/18* (2022.01)

(58) Field of Classification Search
   CPC ............ G07C 2205/02; G05B 23/0213; G05B 23/0216; G05B 2219/24065; H04L 69/08; H04L 69/18
   USPC ..... 710/2, 14, 15, 33, 38, 62, 105, 266, 300
   See application file for complete search history.

(56) References Cited

U.S. PATENT DOCUMENTS

| | | | |
|---|---|---|---|
| 8,856,744 | B2 | 10/2014 | Overby |
| 9,268,381 | B2 | 2/2016 | He |
| 9,529,758 | B1* | 12/2016 | Szeto .................... G06F 13/364 |
| 2008/0215765 | A1* | 9/2008 | Butler .................... G06F 1/3253 710/15 |
| 2009/0177818 | A1* | 7/2009 | Shim ...................... G09G 5/006 710/100 |
| 2010/0129062 | A1* | 5/2010 | Nakajima ............ H04N 21/458 386/241 |
| 2012/0151114 | A1* | 6/2012 | Zou ...................... G06F 13/426 710/316 |
| 2012/0311203 | A1* | 12/2012 | Monks ................ G06F 13/4291 710/63 |
| 2013/0048372 | A1 | 2/2013 | Overby |
| 2013/0103966 | A1* | 4/2013 | Liu ........................ G06F 1/266 713/340 |
| 2014/0013024 | A1* | 1/2014 | Lamm .................... H01R 31/06 710/313 |
| 2015/0089092 | A1 | 3/2015 | Voto et al. |
| 2015/0356045 | A1* | 12/2015 | Soffer ..................... G06F 3/023 710/303 |
| 2016/0371099 | A1* | 12/2016 | Woog ..................... H04L 69/28 |
| 2017/0329733 | A1* | 11/2017 | Lin ..................... G06F 13/4068 |
| 2018/0189222 | A1* | 7/2018 | Srivastava ............ G06F 13/287 |
| 2019/0044785 | A1 | 2/2019 | Vadivelu et al. |
| 2020/0233824 | A1 | 7/2020 | Liao |

FOREIGN PATENT DOCUMENTS

| | | |
|---|---|---|
| CN | 102662431 A | 9/2012 |
| CN | 202694324 U | 1/2013 |
| CN | 103365388 A | 10/2013 |
| CN | 207909114 U | 9/2018 |
| CN | 208188819 U | 12/2018 |
| CN | 209030353 U | 6/2019 |
| CN | 110209620 A | 9/2019 |
| CN | 210895119 U | 6/2020 |
| EP | 2650752 B1 | 9/2016 |
| EP | 3618451 A1 | 4/2020 |
| TW | 201324133 A | 6/2013 |
| WO | 2013152662 A1 | 10/2013 |
| WO | WO-2019015681 A1 * | 1/2019 ........... G06F 13/385 |
| WO | 2019071579 A1 | 4/2019 |

OTHER PUBLICATIONS

International search report of PCT/CN2020/120437; dated Jan. 11, 2021.

The first Chinese Office Action dated Mar. 1, 2023; Appln. No. 201910996120.4.

* cited by examiner

INTERFACE CIRCUIT, AND METHOD AND APPARATUS FOR INTERFACE COMMUNICATION THEREOF

CROSS REFERENCE

This application claims priority to PCT Application No. PCT/CN2020/120437 filed on Oct. 12, 2020, which claims priority to Chinese Patent Application No. 201910996120.4, entitled "Interface Circuit and Method and Apparatus for Interface Communication Thereof", filed with the China Patent Office of CNIPA on Oct. 18, 2019, which is incorporated herein by reference in its entirety.

BACKGROUND

Technical Field

The present application relates to the technical field of automobiles and software, more particularly, to an interface circuit, and a method and apparatus for interface communication thereof.

Related Art

To improve the quality of maintenance, an automobile diagnostic device is provided with a plurality of docking interfaces through which a plurality of external devices are connected to the equipment for data collection and gathering various diagnostic data.

However, in implementing the present invention, the inventors have found that the docking interfaces of the automobile diagnostic device in the prior art are directly connected to output interfaces of a micro-control unit to establish communication with the micro-control unit, but due to the improved integration of the micro-control unit, the micro-control unit has fewer output interfaces, and accordingly, fewer docking interfaces are provided. As a result, the automobile diagnostic device does not have a sufficient number of docking interfaces and can hardly fulfill its function of automobile diagnosis.

Therefore, it is an urgency at present to solve the technical problem of how to ensure a sufficient number of docking interfaces of an automobile diagnostic device in the case of fewer output interfaces of a micro-control unit.

SUMMARY

It is an object of the embodiments of the present invention to provide an interface circuit capable of effectively preventing the number of docking interfaces from decreasing as the number of output interfaces of a micro-control unit decreases, and a method and apparatus for interface communication thereof.

To solve the above technical problem, the embodiments of the present invention adopt the technical solution as follows: an interface circuit, including: a USB HOST interface, a USB SLAVE interface, an HDMI interface, a first conversion unit, a second conversion unit, and a micro-control unit; wherein output interfaces of the micro-control unit are connected to an input terminal of the first conversion unit and an input terminal of the second conversion unit, respectively, an output terminal of the first conversion unit is connected to the USB HOST interface and the USB SLAVE interface, respectively, and an output terminal of the second conversion unit is connected to the HDMI interface;

the micro-control unit is configured to control the first conversion unit to be set in a HOST mode when receiving a trigger signal from the USB HOST interface so as to establish communication between the micro-control unit and the USB HOST interface;

the micro-control unit is further configured to control the first conversion unit to be set in a SLAVE mode when receiving a trigger signal from the USB SLAVE interface so as to establish communication between the micro-control unit and the USB SLAVE interface; and the micro-control unit is further configured to control the second conversion unit to output a TMDS signal when receiving a trigger signal from the HDMI interface so as to establish communication between the micro-control unit and the HDMI interface.

Optionally, the output interfaces of the micro-control unit include a USB 3.1 interface, wherein the USB 3.1 interface includes a USB 2.0 DRD pin and a USB 3.1 DATA pin;

the micro-control unit is connected to the input terminal of the first conversion unit through the USB 2.0 DRD pin, and when the micro-control unit receives the trigger signal from the USB HOST interface, the micro-control unit controls the USB 2.0 DRD pin to work in the HOST mode, and when the micro-control unit receives the trigger signal from the USB SLAVE interface, the micro-control unit controls the USB 2.0 DRD pin to work in the SLAVE mode;

the micro-control unit is connected to the input terminal of the second conversion unit through the USB 3.1 DATA pin, and when the micro-control unit receives the trigger signal from the HDMI interface, the micro-control unit controls the USB 3.1 DATA pin to output a DP signal to the second conversion unit.

Optionally, the first conversion unit includes: a USB SWITCH;

an input terminal of the USB SWITCH is connected to the USB 2.0 DRD pin, and an output terminal of the USB SWITCH is connected to the USB HOST interface and the USB SLAVE interface, respectively.

Optionally, at least two USB HOST interfaces are provided, then the first conversion unit further includes:

a USB HUB, wherein an input terminal of the USB HUB is connected to the output terminal of the USB SWITCH, and an output terminal of the USB HUB is connected to the at least two USB HOST interfaces, respectively.

Optionally, the second conversion unit includes: a protocol converter;

an input terminal of the protocol converter is connected to the USB 3.1 DATA pin, and an output terminal of the protocol converter is connected to the HDMI interface.

Optionally, the USB SWITCH includes: a SWITCH chip, a power supply circuit, a switch enabling circuit, and a control circuit;

a power supply terminal of the SWITCH chip is connected to the power supply circuit;

a switch enabling terminal of the SWITCH chip is connected to the switch enabling circuit through a logic inverter;

a control terminal of the SWITCH chip is connected to a terminal of the control circuit, and another terminal of the control circuit is connected to the USB 2.0 DRD pin;

a data input positive electrode and a data input negative electrode of the SWITCH chip are connected to the USB 2.0 DRD pin;

a first data output positive electrode and a first data output negative electrode of the SWITCH chip are connected to the USB HOST interface;

a second data output positive electrode and a second data output negative electrode of the SWITCH chip are connected to the USB SLAVE interface;

a ground terminal of the SWITCH chip is grounded.

Optionally, the power supply circuit includes: a first resistor, a first capacitor, and a second capacitor;

a first terminal of the first resistor is connected to a voltage, and a second terminal of the first resistor is connected to a first node;

a first terminal of the first capacitor is connected to the first node, and a second terminal of the first capacitor is grounded;

a first terminal of the second capacitor is connected to the first node, and a second terminal of the second capacitor is grounded; and the first node accesses the power supply terminal of the SWITCH chip.

Optionally, the switch enabling circuit includes: a second resistor;

a first terminal of the second resistor is connected to a logic inverter of the switch enabling terminal of the SWITCH chip, and a second terminal of the second resistor is grounded.

Optionally, the control circuit includes: a third resistor, a fourth resistor, a fifth resistor, a sixth resistor, and a third capacitor;

a first terminal of the third resistor is connected to OTG_VBUS, and a second terminal of the third resistor is connected to a second node;

a first terminal of the fourth resistor is connected to the second node, and a second terminal of the fourth resistor is connected to a third node;

a first terminal of the fifth resistor is connected to the third node, and a second terminal of the fifth resistor is grounded;

a first terminal of the sixth resistor is connected to the third node, and a second terminal of the sixth resistor is connected to the USB 2.0 DRD pin;

a first terminal of the third capacitor is connected to the third node, and a second terminal of the third capacitor is grounded; and the second node accesses the control terminal of the SWITCH chip.

To solve the above technical problem, the embodiments of the present invention adopt a further technical solution as follows: a method for interface communication, applied to the above-mentioned interface circuit, including:

acquiring a trigger signal, wherein the trigger signal is generated by plugging an external device into the interface circuit;

determining an interface to which the external device is plugged according to the trigger signal; and establishing a communication connection with the interface.

Optionally, the interface includes: a USB HOST interface, a USB SLAVE interface, and an HDMI interface, then establishing a communication connection with the interface specifically includes:

controlling the first conversion unit to be set in a HOST mode if the interface is the USB HOST interface so as to establish a communication connection with the USB HOST interface;

controlling the first conversion unit to be set in a SLAVE mode if the interface is the USB SLAVE interface so as to establish a communication connection with the USB SLAVE interface; and controlling the second conversion unit to output a TMDS signal if the interface is the HDMI interface so as to establish a communication connection with the HDMI interface.

Optionally, before controlling the first conversion unit to be set in a HOST mode, the method further includes determining whether the first conversion unit is in the SLAVE mode;

if yes, sending a first interface conversion prompt to a user, and after receiving an instruction authorizing the first interface conversion returned by the user, controlling the first conversion unit to be set in the HOST mode.

Optionally, before controlling the first conversion unit to be set in a SLAVE mode, the method further includes:

determining whether the first conversion unit is in the HOST mode;

if yes, sending a second interface conversion prompt to a user, and after receiving an instruction authorizing the second interface conversion returned by the user, controlling the first conversion unit to be set in a SLAVE mode.

To solve the above technical problem, the embodiments of the present invention adopt a further technical solution as follows: an apparatus for interface communication, applied to the above-mentioned interface circuit, including:

an acquisition module for acquiring a trigger signal, wherein the trigger signal is generated by plugging an external device into the interface circuit;

a determination module for determining an interface to which the external device is plugged according to the trigger signal; and an establishment module for establishing a communication connection with the interface.

Optionally, the interface includes: a USB HOST interface, a USB SLAVE interface, and an HDMI interface, then the establishment module is specifically configured to:

control the first conversion unit to be set in a HOST mode if the interface is the USB HOST interface so as to establish a communication connection with the USB HOST interface;

control the first conversion unit to be set in a SLAVE mode if the interface is the USB SLAVE interface so as to establish a communication connection with the USB SLAVE interface; and control the second conversion unit to output a TMDS signal if the interface is the HDMI interface so as to establish a communication connection with the HDMI interface.

Optionally, before controlling the first conversion unit to be set in a HOST mode, the determination module is further configured to:

determine whether the first conversion unit is in the SLAVE mode;

if yes, send a first interface conversion prompt to a user, and after receiving an instruction authorizing the first interface conversion returned by the user, control the first conversion unit to be set in the HOST mode.

Optionally, before controlling the first conversion unit to be set in a SLAVE mode, the determination module is further configured to:

determine whether the first conversion unit is in the HOST mode;

if yes, send a second interface conversion prompt to a user, and after receiving an instruction authorizing the second interface conversion returned by the user, control the first conversion unit to be set in a SLAVE mode.

To solve the above technical problem, the embodiments of the present invention adopt a further technical solution as follows: an automobile diagnostic device, including the interface circuit described above;

wherein the micro-control unit is configured to execute the method for interface communication described above.

To solve the above technical problem, the embodiments of the present invention adopt a further technical solution as follows: a non-volatile computer-readable storage medium, wherein the non-volatile computer-readable storage medium stores computer-executable instructions for causing an automobile diagnostic device to perform the method for interface communication described above.

The embodiments of the present invention are more advantageous than the prior art because the embodiments of the present invention provide an interface circuit and a method and apparatus for interface communication thereof, wherein the interface circuit includes a USB HOST interface, a USB SLAVE interface, an HDMI interface, a first conversion unit, a second conversion unit, and a micro-control unit; the first conversion unit includes a HOST mode and a SLAVE mode, and the second conversion unit can output a TMDS signal, so output interfaces of the micro-control unit can be connected to the USB HOST interface and the USB SLAVE interface through the first conversion unit, and can be connected to the HDMI interface through the second conversion unit, that is, with one output interface of the micro-control unit connected to the conversion unit, the micro-control unit can be connected to a plurality of docking interfaces through the conversion unit. Therefore, even if the number of output interfaces of the micro-control unit decreases, the micro-control unit can still be connected to a plurality of docking interfaces, effectively preventing the number of docking interfaces from decreasing as the number of output interfaces of the micro-control unit decreases.

BRIEF DESCRIPTION OF THE DRAWINGS

One or more embodiments are illustrated by way of example and not by way of limitation in the accompanying drawings, in which elements having the same reference numeral designations are represented as similar elements, and in which the figures are not to scale unless otherwise specified.

DETAILED DESCRIPTION

In order that the objects, aspects and advantages of the embodiments of the present invention will become more apparent, a more complete description of the embodiments of the present invention will be rendered by reference to the accompanying drawings, which apparently reveal only some of the embodiments and are not intended to be exhaustive of the present invention. It should be understood that the particular embodiments described herein are illustrative only and are not limiting. Based on the embodiments of the present invention, all other embodiments obtained by a person of ordinary skill in the art without inventive effort fall within the scope of the present invention.

It will be understood that when an element is referred to as being "secured" to another element, it can be on the other element directly or through intermediate elements. When an element is referred to as being "connected" to another element, it can be connected to the other element directly or through intermediate elements. The terms like "vertical", "horizontal", "left", "right", and so on are used herein for descriptive purposes only.

Furthermore, the technical features involved in the various embodiments of the present invention described below can be combined with each other as long as they do not conflict with each other.

The present invention provides an interface circuit and a method and apparatus for interface communication thereof, wherein the interface circuit can be applied to electronic devices with high requirements for the integration level of a micro-control unit, such as an automobile diagnostic device, an automobile ADAS detection device, an automobile four-wheel positioning detection device, and an industrial video endoscope, so that the electronic device employing the interface circuit can still have various docking interfaces even though the number of output interfaces of the micro-control unit decreases, thereby meeting the requirements for use as a product.

Hereinafter, the present invention will be described in detail by taking an application of the interface circuit to an automobile diagnostic device as an example.

Figure 1:
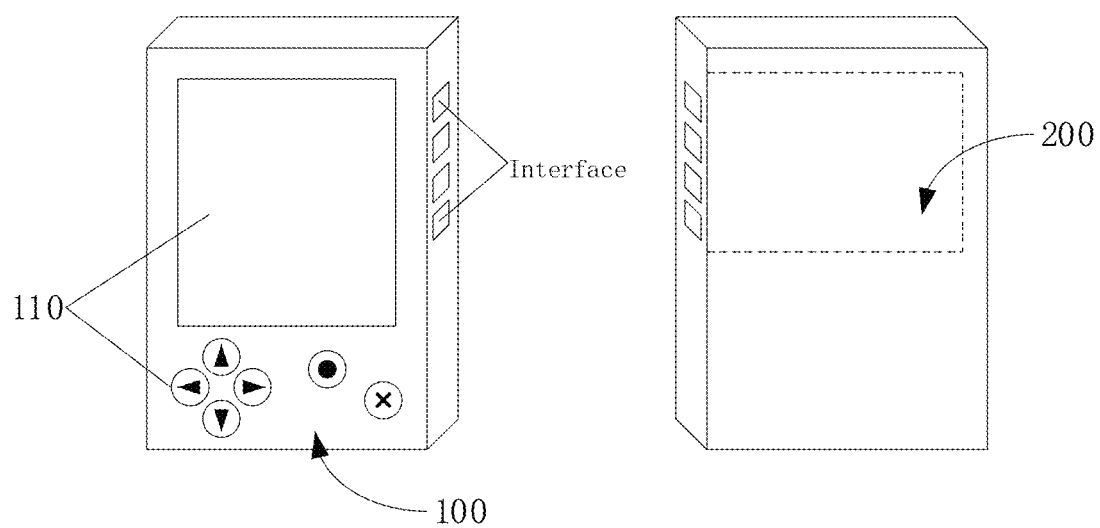
FIG. 1 is a schematic view showing a structure of an automobile diagnostic device according to an embodiment of the present invention.
Figure 2:
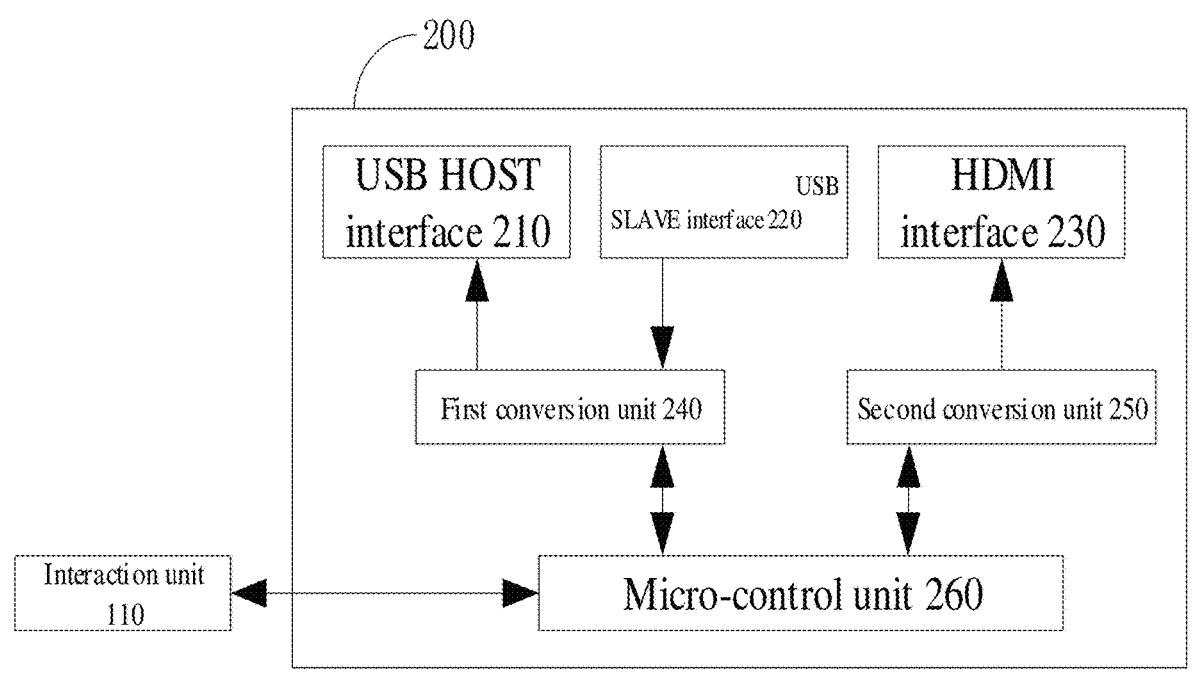
FIG. 2 is a diagram showing connections of an automobile diagnostic device according to an embodiment of the present invention.

Referring to FIGS. 1 and 2, an automobile diagnostic device according to an embodiment of the present invention includes: a device body 100 and an interface circuit 200, wherein the interface circuit 200 is provided in the device body 100, and an interface of the interface circuit 200 is embedded in a sidewall of the device body 100. Herein, when the interface of the interface circuit 200 is embedded in the sidewall of the device body 100, the interface is in communication with external devices, and the automobile diagnostic device can be connected to an external device through the interface, and in this case, the interface of the interface circuit 200 is also a docking interface.

Specifically, the device body 100 is provided with an interaction unit 110 for interacting with a user, including displaying contents to the user, receiving a trigger operation of the user, etc.

The interaction unit 110 may be a touch screen or a combination of a screen and keys. If the interaction unit 110 is a touch screen, contents can be displayed to the user through the touch screen, and the trigger operation of the user can also be received through the touch screen; if the interaction unit 110 is a combination of a screen and keys, contents can be displayed to the user through the screen, and the trigger operation of the user can be received through the keys.

The interaction unit 110 is communicatively connected to the interface circuit 200 and is capable of displaying an interface conversion prompt sent by the interface circuit 200 to the user, and when the interaction unit 110 displays the interface conversion prompt to the user, the interaction unit 110 is capable of receiving a trigger operation of the user in response to the interface conversion prompt, the trigger operation including an instruction authorizing the interface conversion or an instruction prohibiting the interface conversion.

The interaction unit 110 can send the instruction authorizing the interface conversion or the instruction prohibiting the interface conversion carried by the trigger operation to the interface circuit 200 after receiving the trigger operation of the user in response to the interface conversion prompt.

It will be appreciated that the interaction unit 110 is also capable of displaying automobile diagnostic functions, automobile diagnostic data, and the like to the user.

The interface circuit 200 includes: a USB HOST interface 210, a USB SLAVE interface 220, an HDMI interface 230, a first conversion unit 240, a second conversion unit 250, and a micro-control unit 260.

The interface circuit 200 is communicatively connected to the interaction unit 110 through the micro-control unit 260, and the micro-control unit 260 is configured to send the interface conversion prompt to the interaction unit 110 and receive the instruction authorizing the interface conversion or the instruction prohibiting the interface conversion returned according to the trigger operation of the user. Herein, the micro-control unit 110 is communicatively connected to the interaction unit 110 through other interfaces.

In the interface circuit 200, the micro-control unit 260 is connected to an input terminal of the first conversion unit 240 and an input terminal of the second conversion unit 250 through one output interface, respectively, an output terminal of the first conversion unit 240 is connected to the USB HOST interface 210 and the USB SLAVE interface 220, respectively, and an output terminal of the second conversion unit 250 is connected to the HDMI interface 230. Through the first conversion unit 240 and the second conversion unit 250, one output interface of the micro-control unit 260 can also be connected to a plurality of docking interfaces (including the USB HOST interface 210, the USB SLAVE interface 220, and the HAMI interface 230), therefore, even if the number of output interfaces of the micro-control unit 260 decreases, the micro-control unit 260 can still be connected to a plurality of docking interfaces, and the number of docking interfaces can be effectively prevented from decreasing as the number of output interfaces of the micro-control unit 260 decreases.

Herein, the USB HOST interface 210 is configured to connect USB slave devices, and the USB slave devices include but are not limited to a USB flash disk, a keyboard, a mouse, and a mobile hard disk. When a USB slave device is plugged into the USB HOST interface 210, the USB HOST interface 210 generates a trigger signal and sends the trigger signal to the micro-control unit 260.

The USB SLAVE interface 220 is used to connect USB host devices, including but not limited to a private computer. When a USB host device is plugged into the USB SLAVE interface 220, the USB SLAVE interface 220 generates a trigger signal and sends the trigger signal to the micro-control unit 260.

The HDMI interface 230 is a high-definition multimedia interface capable of sending digitized video and sound, and the HDMI interface 230 is configured to connect devices capable of playing video and/or sound, such as a high-definition display. When a device capable of playing video and/or sound is plugged into the HDMI interface 230, the HDMI interface 230 generates a trigger signal and sends the trigger signal to the micro-control unit 260.

The first conversion unit 240 includes a HOST mode and a SLAVE mode, and when the first conversion unit 240 is set in the HOST mode, the first conversion unit 240 transmits data to the USB HOST interface 210; when the first conversion unit 240 is set in the SLAVE mode, the first conversion unit 240 transmits data to the USB SLAVE interface 220. Here, the HOST mode and the SLAVE mode of the first conversion unit 240 are set by the micro-control unit 260.

The second conversion unit 250 can output a TMDS signal, and when the second conversion unit 250 outputs the TMDS signal, the HDMI interface 230 can transmit data through the TMDS signal. Here, the TMDS signal output of the second conversion unit 250 is controlled by the micro control unit 260.

Given the above, after receiving the trigger signal from the USB HOST interface 210, the micro-control unit 260 controls the first conversion unit 240 to be set in the HOST mode, so that communication can be established between the micro-control unit 260 and the USB HOST interface 210; alter receiving the trigger signal from the USB SLAVE interface 220, the micro-control unit 260 controls the first conversion unit 240 to be set in the SLAVE mode, so that communication can be established between the micro-control unit 260 and the USE SLAVE interface 220; after receiving the trigger signal from the HDMI interface 230, the micro control unit 260 controls the second conversion unit 250 to output the TMDS signal, so that communication can be established between the micro control unit 260 and the HDMI interface 230. Therefore, the micro-control unit 260 is configured to control the first conversion unit 240 to be set in the HOST mode when receiving the trigger signal 210 from the USE HOST interface so as to establish communication between the micro-control unit 260 and the USE HOST interface 210, control the first conversion unit 240 to be set in the SLAVE mode when receiving the trigger signal from the USB SALVE interface 220 so as to establish communication between the micro-control unit 260 and the USE SLAVE interface 220, and control the second conversion unit 250 to output the TMDS signal when receiving the trigger signal from the HDMI interface 230 so as to establish communication between the micro-control unit 260 and the HDMI interface 230; at this time, regardless of which of the plurality of docking interfaces is connected to the micro-control unit 260, normal operation is ensured.

In some embodiments, the output interface of the micro-control unit 260 is a USB 3.1 interface. Since the USB 3.1 interface can be backward compatible with USB 2.0, and the USB 3.1 interface can realize the transmission of high-definition multimedia signals at a rate of 10 Gbps, the pin of the USB 3.1 interface is divided into a USB 2.0 DRD pin which can realize USB master-slave control and a USB 3.1 DATA pin which can realize the transmission of high-definition multimedia signals.

Figure 3:
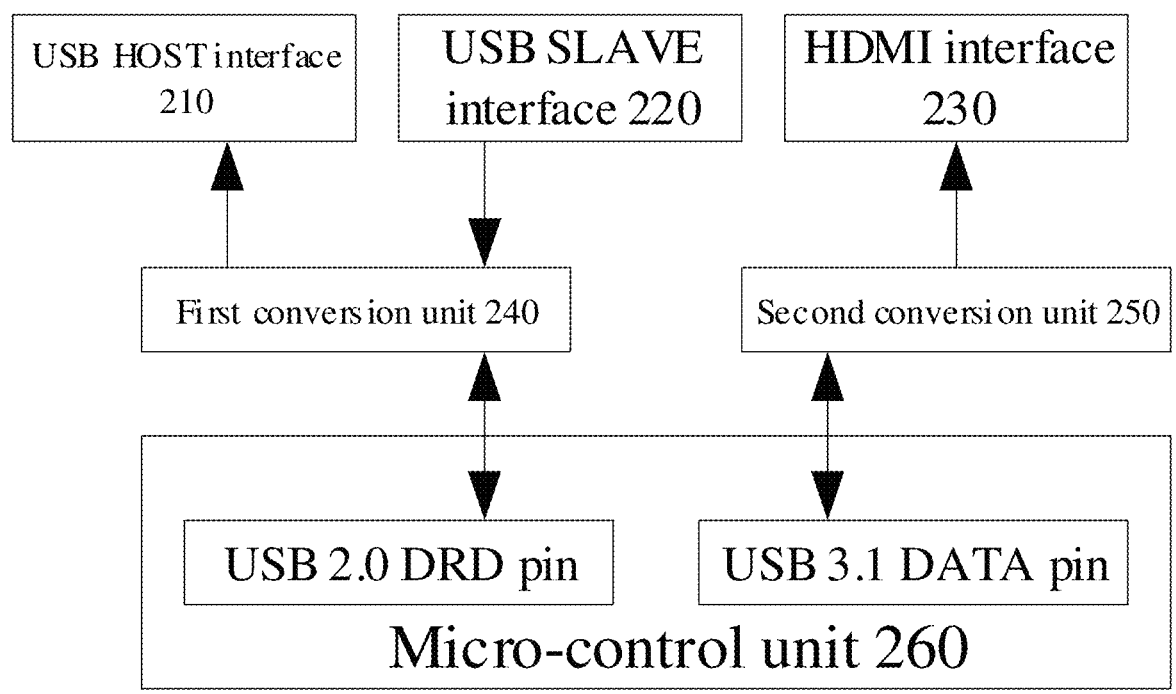
FIG. 3 is a schematic diagram showing a structure of an interface circuit according to another embodiment of the present invention.

Given the above, with reference to FIG. 3, the first conversion unit 240 is connected to the USB HOST interface 210 and the USB SLAVE interface 220, respectively, and the USB 2.0 ORD pin can realize the USB master-slave control, so the micro-control unit 250 is connected to the input terminal of the first conversion unit 240 through the USE 2.0 ORD pin so as to realize the USB HOST interface function and the USB SLAVE interface function based on the USE master-slave control of the USB 2.0 DRD pin; the second conversion unit 250 is connected to the HDMI interface 230, and the USB 3.1 DATA pin can realize the transmission of high-definition multimedia signals, so the micro-control unit 260 is connected to the input terminal of the second conversion unit 250 through the USB 3.1 DATA pin so as to realize the HAMI interface function based on the transmission of high-definition multimedia signals enabled by the USB 3.1 DATA pin.

Here, when the micro-control unit 260 receives the trigger signal from the USB HOST interface 210, the micro-control unit 260 controls the USB 2.0 DRD pin to work in the HOST mode, that is, to enable the USB 2.0 DRD pin to realize a master device function; when the micro-control unit 260 receives the trigger signal from the USB SLAVE interface 220, the micro-control unit 260 controls the USB 2.0 DRD pin to work in the SLAVE mode, that is, to enable the USB 2.0 DRD pin to realize a slave device function; when the micro-control unit 260 receives the trigger signal from the HDMI interface 230, the micro-control unit 260 controls the USB 3.1 DATA pin to output the DP signal to the second conversion unit 250.

Figure 4:
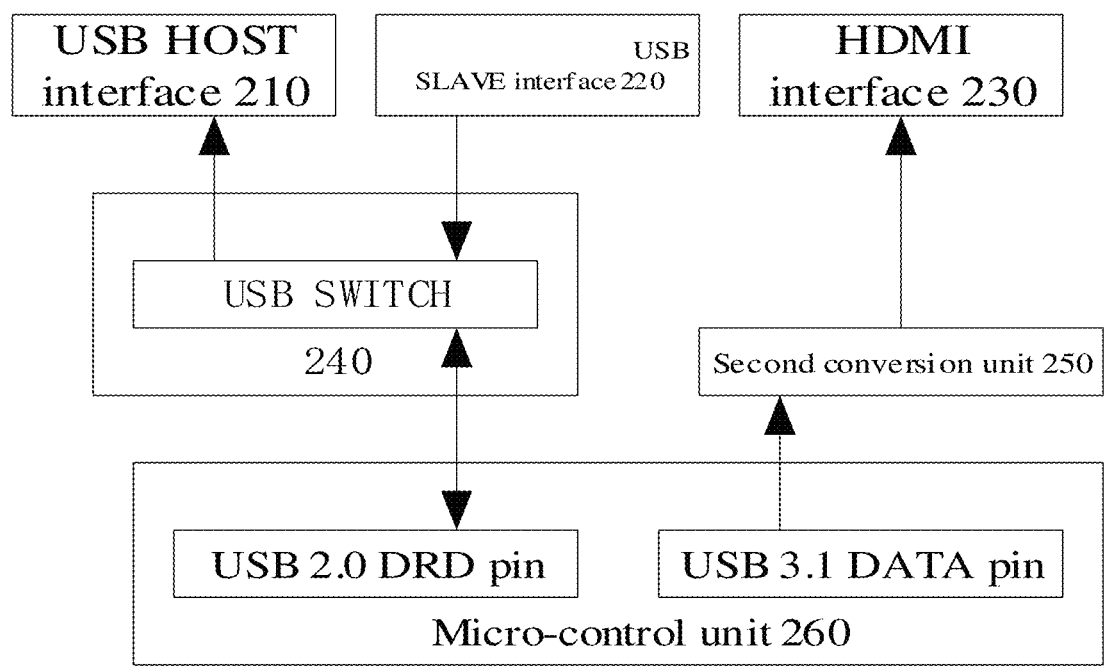
FIG. 4 is a schematic diagram showing a structure of the interface circuit according to yet another embodiment of the present invention.
Figure 5:
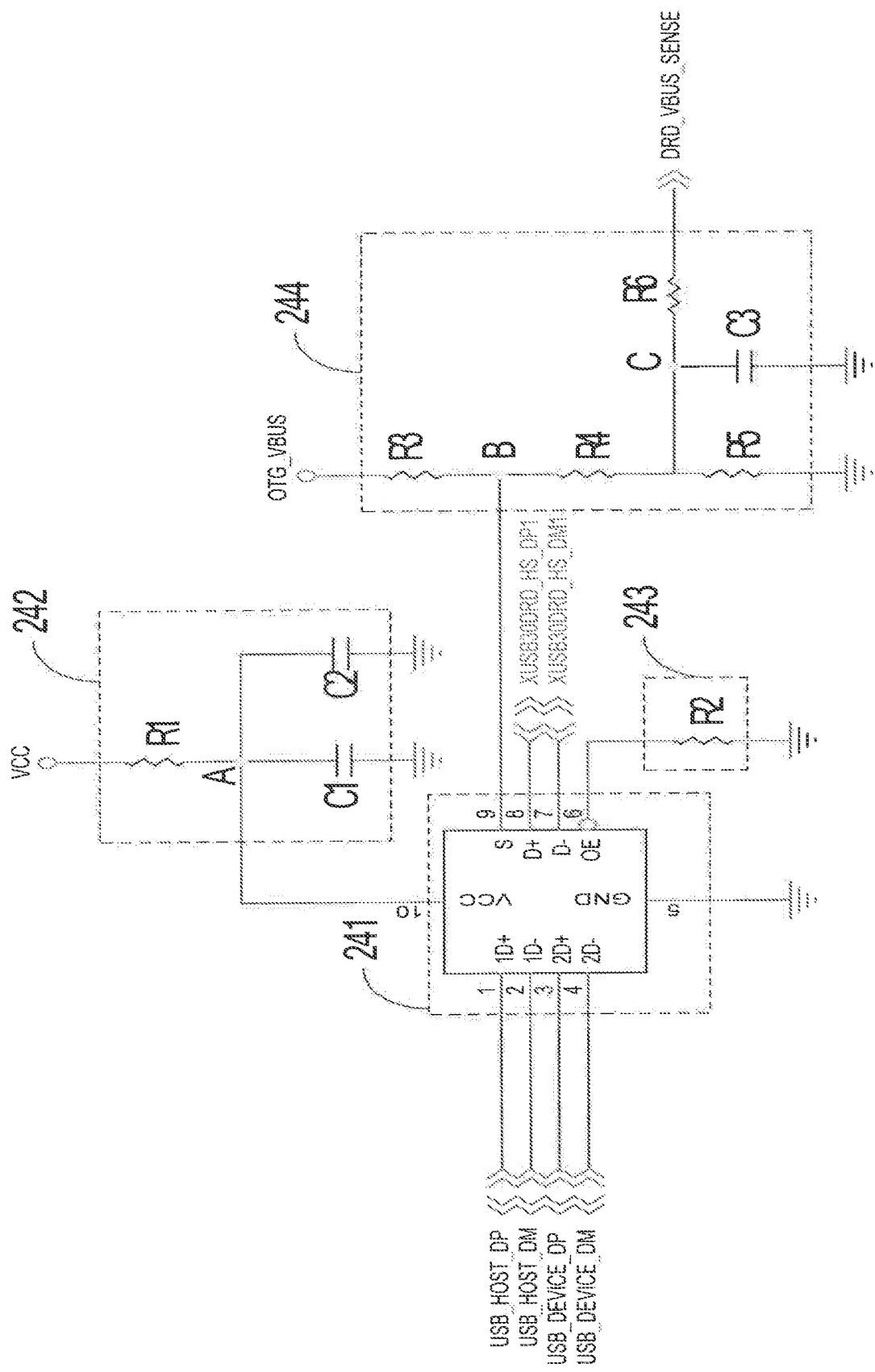
FIG. 5 is a diagram showing circuit connections of the interface circuit according to yet another embodiment of the present invention.

Furthermore, referring to FIGS. 4 and 5, in some embodiments, the first conversion unit 240 includes: a USB SWITCH, wherein an input terminal of the USB SWITCH is connected to the USB 2.0 DRD pin, and an output terminal of the USB SWITCH is connected to the USB HOST interface 210 and the USB SLAVE interface 220, respectively.

Here, the USB SWITCH specifically includes: a SWITCH chip 241, a power supply circuit 242, a switch enabling circuit 243, and a control circuit 244, wherein the power supply circuit 242 is connected to a power supply terminal VCC of the SWITCH chip 241, the switch enabling circuit 243 is connected to a switch enabling terminal OE of the SWITCH chip 241 through a logic inverter, the control circuit 244 is connected to a control terminal S of the SWITCH chip 241, and a ground terminal GND of the SWITCH chip is grounded.

The USB SWITCH is connected to a USB 2.0 DRD pin through a data input positive electrode D+, a data input negative electrode D−, and the control circuit 244 of the SWITCH chip 241, is connected to the USB HOST interface 210 through a first data output positive electrode 1D+ and a first data output negative electrode 1D− of the SWITCH chip 241, and is connected to the USB SWITCH interface 220 through a second data output positive electrode 2D+ and a second data output negative electrode 2D− of the SLAVE chip 241.

Here, the power supply circuit 242 is configured to supply power to the SWITCH chip 241, and the power supply circuit 242 includes a first resistor R1, a first capacitor C1, and a second capacitor C2.

A first terminal of the first resistor R1 is connected to a voltage, and a second terminal of the first resistor R1 is connected to a first node A; a first terminal of the first capacitor C1 is connected to the first node A, and a second terminal of the first capacitor C1 is grounded; a first terminal of the second capacitor C2 is connected to the first node A, and a second terminal of the second capacitor C2 is grounded; the first node A is connected to the power supply terminal VCC of the SWITCH chip 241.

In the power supply circuit 242, upon a voltage input, the power supply circuit 242 filters the voltage before outputting to the power supply terminal VCC.

The switch enabling circuit 243 is used to enable the SWITCH chip 241, and the switch enabling circuit 243 includes a second resistor.

A first terminal of the second resistor R2 is connected to the switch enabling terminal OE of the SWITCH chip 241 through a logic inverter, and a second terminal of the second resistor R2 is grounded.

The control circuit 244 is configured to control a data transmission path of the SWITCH chip 241, and the control circuit 244 includes: a third resistor R3, a fourth resistor R4, a fifth resistor R5, a sixth resistor R6, and a third capacitor C3.

A first terminal of the third resistor R3 is connected to OTG_VBUS, and a second terminal of the third resistor R3 is connected to the second node B; a first terminal of the fourth resistor R4 is connected to the second node B, and a second terminal of the fourth resistor R4 is connected to a third node C; a first terminal of the fifth resistor R5 is connected to the third node C, and a second terminal of the fifth resistor R5 is grounded; a first terminal of the sixth resistor R6 is connected to the third node C, and a second terminal of the sixth resistor R6 is connected to the USB 2.0 DRD pin; a first terminal of the third capacitor C3 is connected to the third node C, and a second terminal of the third capacitor C3 is grounded; the second node B accesses the control terminal S of the SWITCH chip 241.

When the control circuit 244 inputs a low level into the control terminal S, the SWITCH chip 241 transmits data through the first data output positive electrode 1D+ and the first data output negative electrode 1D−, and at this time, the USB SWITCH is in the HOST mode; when the control circuit 244 inputs a high level into the control terminal S, the SWITCH chip 241 transmits data through the second data output positive electrode 2D+ and the second data output negative electrode 2D−, and at this time, the USB SWITCH is in the SLAVE mode.

Given the above, when the micro-control unit 260 receives the trigger signal from the USB HOST interface 210, the micro-control unit 260 controls the control circuit 244 to output the low level to the control terminal S of the SWITCH chip 241, and controls the SWITCH chip 241 to transmit data through the first data output positive electrode 1D+ and the first data output negative electrode 1D−, so that the USB SWITCH is set in the HOST mode; when the micro-control unit 260 receives the trigger signal from the USB SLAVE interface 220, the micro-control unit 260 controls the control circuit 244 to output the high level to the control terminal S of the SWITCH chip 241, and controls the SWITCH chip 241 to transmit data through the second data output positive electrode 2D+ and the second data output negative electrode 2D−, so that the USB SWITCH is set in the SLAVE mode.

Figure 6:
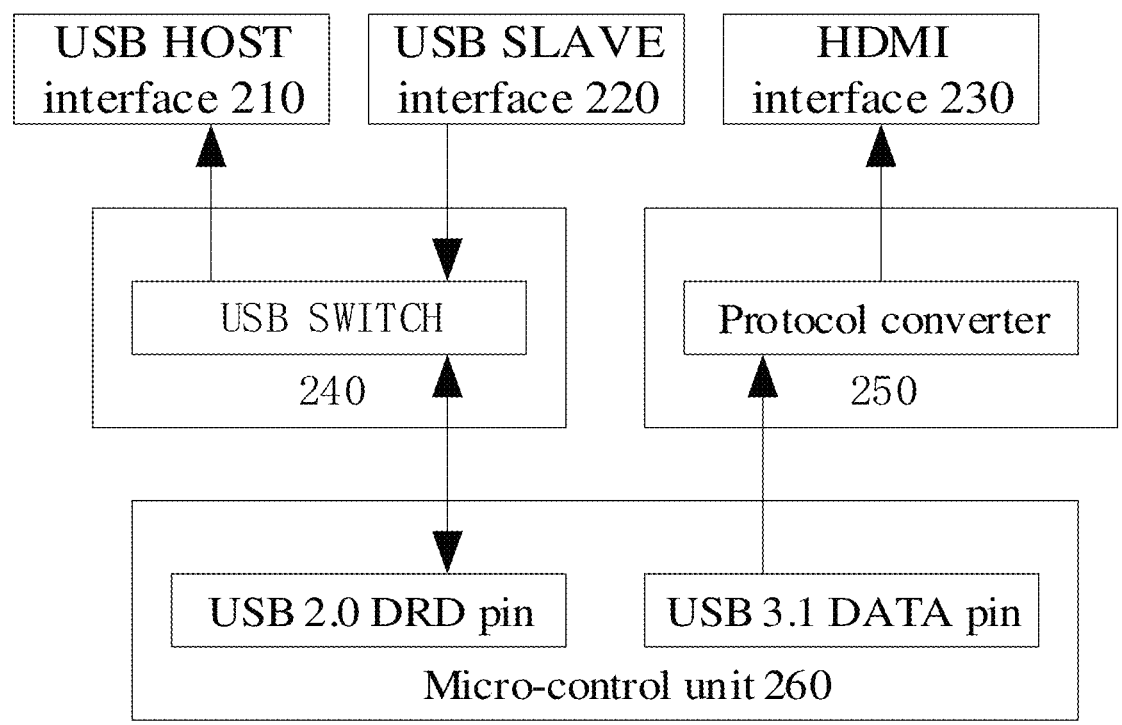
FIG. 6 is a schematic diagram showing a structure of the interface circuit according to still another embodiment of the present invention.

Furthermore, referring to FIG. 6, in some embodiments, the second conversion unit 250 includes: a protocol converter, wherein an input terminal of the protocol converter is connected to the USB 3.1 DATA pin, and an output terminal of the protocol converter is connected to the HDMI interface 230.

Here, the protocol converter is capable of converting the DP signal to the TMDS signal output.

Figure 7:
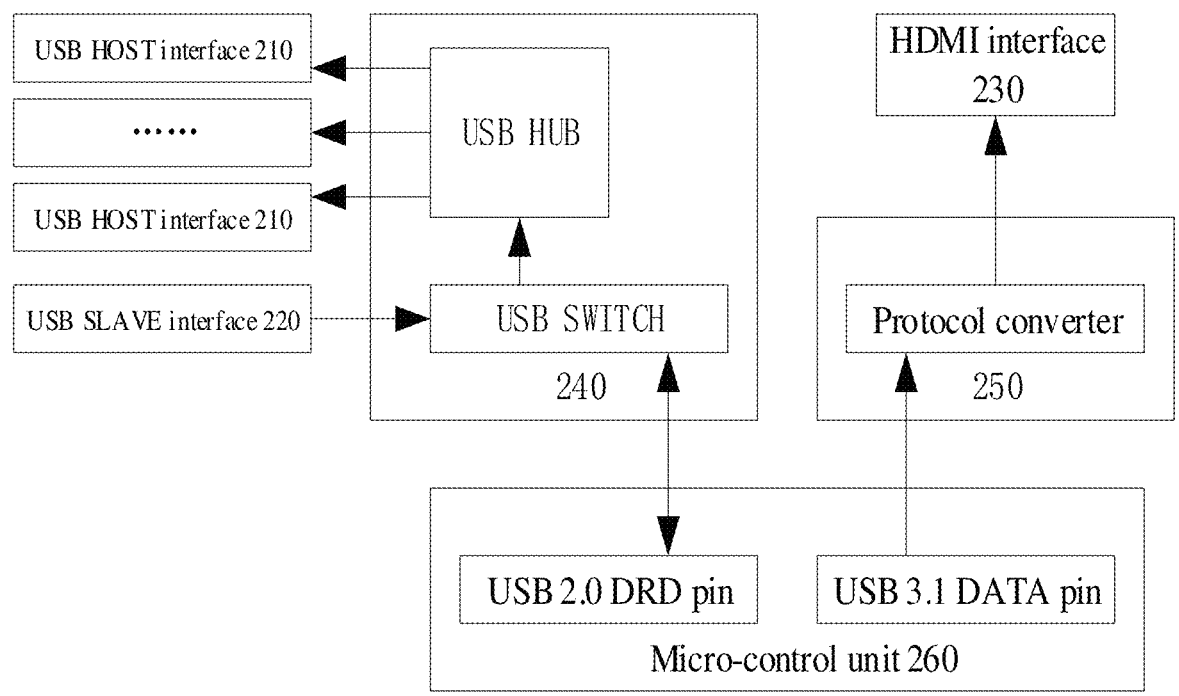
FIG. 7 is a schematic diagram showing a structure of the interface circuit according to an additional embodiment of the present invention.

Furthermore, if there is a large demand for USB slave devices, it is necessary to provide at least two USB HOST interfaces 210. Given this, referring to FIG. 7, when the number of the USB HOST interfaces 210 is at least two, the first conversion unit 240 further includes a USB HUB, an input terminal of the USB HUB is connected to an output terminal of the USB SWITCH, and an output terminal of the USB HUB is connected to at least two USB HOST interfaces, respectively, and data can be transmitted to a plurality of different USB HOST interfaces 210 through the USB HUB.

In the interface circuit provided by the embodiment of the present invention, the output interface of the micro-control unit is connected to the first conversion unit and the second conversion unit through which the micro-control unit is then connected to a plurality of docking interfaces, so that one output interface of the micro-control unit can also be connected to a plurality of docking interfaces. Therefore, even if the number of output interfaces of the micro-control unit decreases, the micro-control unit can be connected to a plurality of docking interfaces, and the number of docking interfaces can be effectively prevented from decreasing as the number of output interfaces of the micro-control unit decreases.

Figure 8:
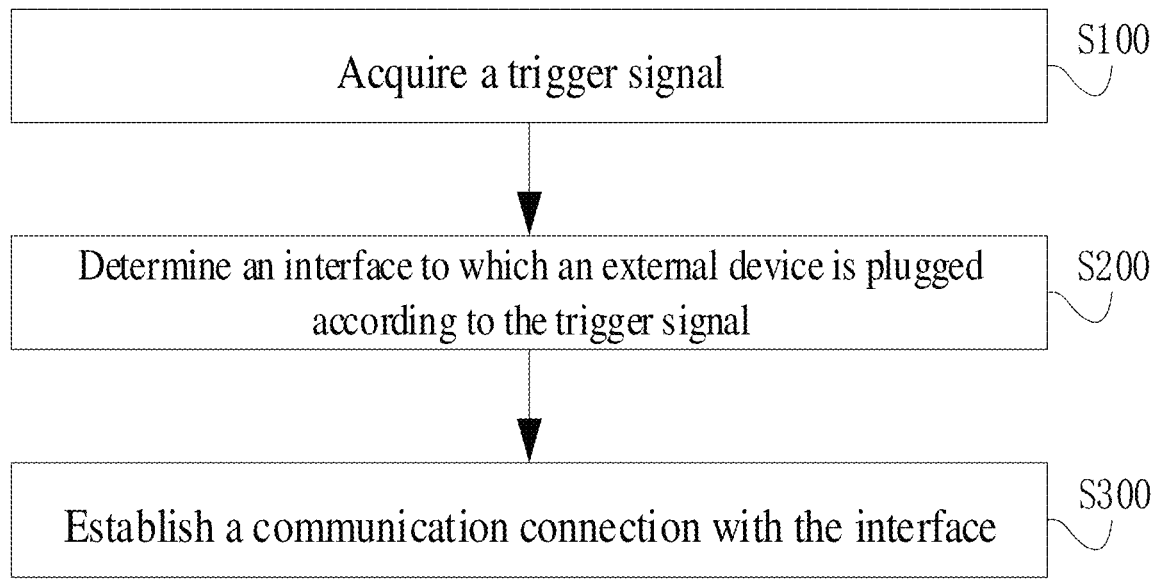
FIG. 8 is a flow chart of a method for interface communication according to an embodiment of the present invention.

Furthermore, referring to FIG. 8, a schematic flow chart of a method for interface communication applied to the interface circuit 200 and executed by the micro-control unit 260 for ensuring the normal operation of each interface in the interface circuit 200 according to the embodiment of the present invention is shown.

In particular, the method for interface communication includes the steps as follows.

In S100, a trigger signal is acquired.

In S200, an interface to which an external device is plugged is determined according to the trigger signal.

Here, the trigger signal is a signal generated when the external device is plugged into an interface of the interface circuit 200. The interface includes a USB HOST interface, a USB SLAVE interface, and an HDMI interface.

When the external device is plugged into the USB HOST interface, the micro-control unit 260 can receive the trigger signal sent by the USB HOST interface; when the external device is plugged into the USB SLAVE interface, the micro-control unit 260 can receive the trigger signal sent by the USB SLAVE interface; when the external device is plugged into the HDMI interface, the micro-control unit 260 can receive the trigger signal sent by the HDMI interface.

The trigger signal sent by each interface contains an interface identifier, so the interface from which the trigger signal originates can be determined according to the interface identifier contained in the trigger signal, and the interface from which the trigger signal originates is the interface to which the external device is plugged.

The interface identifier may be a signal type or an interface ID.

If the interface identifier is a signal type, the micro-control unit 260 can determine the interface to which the external device is plugged according to the type of the received trigger signal, for example, the signal type of the HDMI interface is an HPD high-level signal, and in this case, if the trigger signal received by the micro-control unit 260 is the HPD high-level signal, it can then be determined that the interface to which the external device is plugged is the HDMI interface.

If the interface identifier is an interface ID, the micro-control unit 260 can determine the interface to which the external device is plugged according to the interface ID contained in the received trigger signal, for example, the interface ID of the HDMI interface is HDMI1, and in this case, if the trigger signal received by the micro-control unit 260 contains HDMI1, it can then be determined that the interface to which the external device is plugged is the HDMI interface.

In S300, a communication connection is established with the interface.

Specifically, if the interface to which the external device is plugged is the USB HOST interface, then the first conversion unit is controlled to be set in the HOST mode so as to establish a communication connection with the USB HOST interface; if the interface to which the external device is plugged in is the USB SLAVE interface, then the first conversion unit is controlled to be set in the SLAVE mode so as to establish a communication connection with the USB SLAVE interface; if the interface to which the external device is plugged is the HDMI interface, then the second conversion unit is controlled to output the TMDS signal to establish a communication connection with the HDMI interface.

In one embodiment, in a case that the first conversion unit includes the USB SWITCH, if the interface to which the external device is plugged is the USB HOST interface, the micro-control unit 260 controls the control circuit to output a low level to a control terminal of the SWITCH chip, and controls the SWITCH chip to transmit data through a first data output positive electrode and a first data output negative electrode, so that the USB SWITCH is set in the HOST mode; if the interface to which the external device is plugged is the USB SLAVE interface, the micro-control unit 260 controls the control circuit to output a high level to the control terminal of the SWITCH chip, and controls the SWITCH chip to transmit data through a second data output positive electrode and a second data output negative electrode, so that the USB SWITCH is set in the SLAVE mode.

In some embodiments, the first conversion unit can be set to operate in either the HOST mode or the SLAVE mode by default. If the first conversion unit is set to work in the HOST mode by default, when the interface to which the external device is plugged is the USB HOST interface, a communication connection with the USB HOST interface can be directly established, and only when the interface to which the external device is plugged is the USB SLAVE interface, the first conversion unit is controlled to be set in the SLAVE mode so as to establish a communication connection with the USB SLAVE interface; if the first conversion unit is set to operate in the SLAVE mode by default, when the interface to which the external device is plugged is the USB SLAVE interface, a communication connection with the USB SLAVE interface can be directly established, and only when the interface to which the external device is plugged is the USB HOST interface, the first conversion unit is controlled to be set in the HOST mode so as to establish a communication connection with the USB HOST interface.

Furthermore, in some embodiments, the USB HOST interface and the USB SLAVE interface based on the USB master-slave control cannot work at the same time, so a determination on whether the first conversion unit is in the SLAVE mode is made before controlling the first conversion unit to be set in the HOST mode so as to ensure that the USB HOST interface and the USB SLAVE interface work normally and orderly; if yes, a first interface conversion prompt is sent to the user, and the first conversion unit is controlled to be set in the HOST mode after the first instruction authorizing the interface conversion returned by the user is received. A determination on whether the first conversion unit is in the HOST mode is made before controlling the first conversion unit to be set in the SLAVE mode; if yes, a second interface conversion prompt is sent to the user, and the first conversion unit is controlled to be set in the SLAVE mode after a second instruction authorizing the interface conversion returned by the user is received.

Here, the first interface conversion prompt is intended to acquire a confirmation from the user of whether to suspend the operation of the USB SLAVE interface and switch to the operation of the USB HOST interface; the second interface conversion prompt is intended to acquire a confirmation from the user of whether to suspend the operation of the USB HOST interface and switch to the operation of the USB SLAVE interface.

The first instruction authorizing the interface conversion is allowing to suspend the operation of the USB SLAVE interface and switch to the operation of the USB HOST interface; the second instruction authorizing the interface conversion is allowing to suspend the operation of the USB HOST interface and switch to the operation of the USB SLAVE interface.

In the embodiment of the present invention, after the interface to which the external device is plugged is identified according to the trigger signal, a communication connection is established with the interface to which the external device is plugged, and the identified interface to which the external device is plugged can transmit data to and from the external device to ensure the normal operation of the interface circuit.

Figure 9:
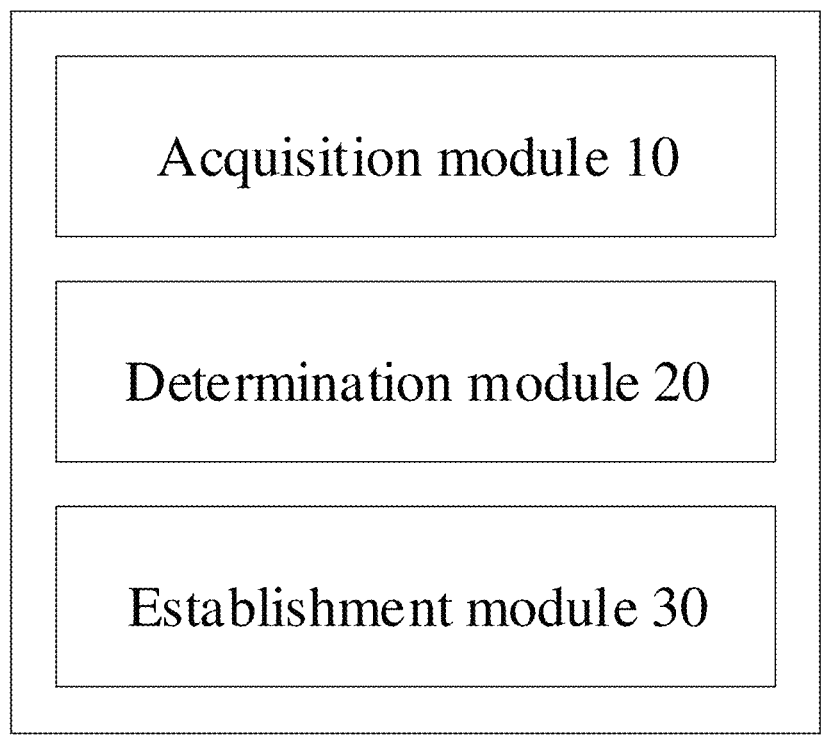
FIG. 9 is a block diagram of an apparatus for interface communication according to an embodiment of the present invention.

Furthermore, referring to FIG. 9, a schematic diagram showing a structure of an apparatus for interface communication according to an embodiment of the present invention, the apparatus for interface communication is applied to the interface circuit 200, and the functions of each module of the apparatus for interface communication are performed by the micro-control unit 260 to ensure the normal operation of each interface in the interface circuit 200.

It should be noted that the term "module" as used by embodiments of the present invention is a combination of software and/or hardware that can perform a predetermined function. While the apparatus described in the following embodiments may be implemented as software, implementations as hardware, or a combination of software and hardware, are also possible.

In particular, the apparatus for interface communication includes:

an acquisition module 10 for acquiring a trigger signal, wherein the trigger signal is generated by plugging an external device into the interface circuit;

a determination module 20 for determining an interface to which the external device is plugged according to the trigger signal; and an establishment module 30 for establishing a communication connection with the interface.

In some embodiments, the interface includes: a USB HOST interface, a USB SLAVE interface, and an HDMI interface, then the establishment module 30 is further configured to:

controlling the first conversion unit to be set in a HOST mode if the interface is the USB HOST interface so as to establish a communication connection with the USB HOST interface;

controlling the first conversion unit to be set in a SLAVE mode if the interface is the USB SLAVE interface so as to establish a communication connection with the USB SLAVE interface; and controlling the second conversion unit to output a TMDS signal if the interface is the HDMI interface so as to establish a communication connection with the HDMI interface.

In some embodiments, before controlling the first conversion unit to be set in a HOST mode, the determination module 20 is further configured to:

determine whether the first conversion unit is in the SLAVE mode;

if yes, send a first interface conversion prompt to a user, and after receiving an instruction authorizing the first interface conversion returned by the user, control the first conversion unit to be set in the HOST mode.

In some embodiments, before controlling the first conversion unit to be set in a SLAVE mode, the determination module 20 is further configured to:

determine whether the first conversion unit is in the HOST mode;

if yes, send a second interface conversion prompt to a user, and after receiving an instruction authorizing the second interface conversion returned by the user, control the first conversion unit to be set in a SLAVE mode.

The product embodiments and the method embodiments are based on the same concept, the method embodiments can be taken as a reference by the product embodiments if not conflicting with each other, and the description thereof will not be repeated.

In other alternative embodiments, the acquisition module 10, the determination module 20, and the establishment module 30 may be processing chips of the micro-control unit 260.

In an embodiment of the present invention, after the interface to which the external device is plugged is identified according to the trigger signal, a communication connection is established with the interface to which the external device is plugged, and the identified interface to which the external device is plugged can transmit data to and from the external device to ensure the normal operation of the interface circuit.

Figure 10:
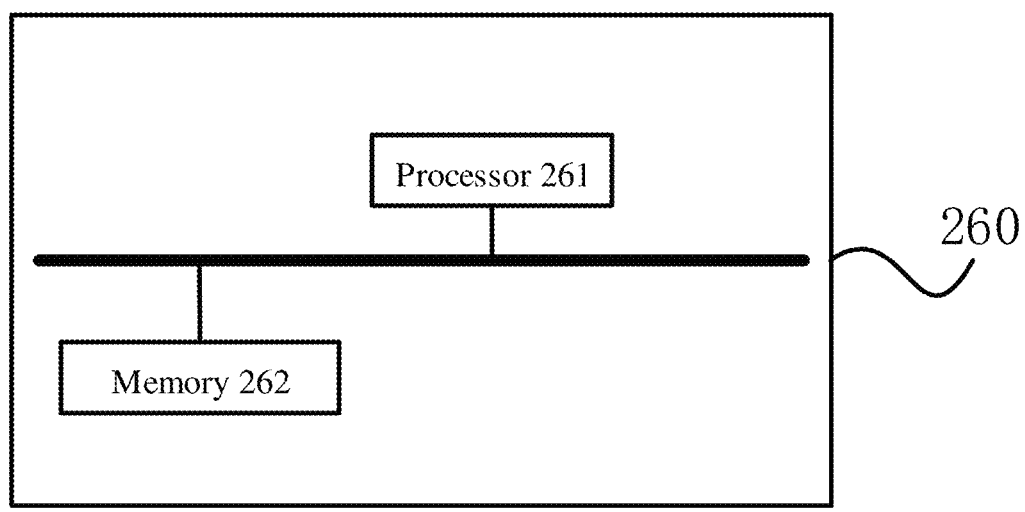
FIG. 10 is a schematic diagram showing a hardware structure of a micro-control unit according to an embodiment of the present invention.

Furthermore, referring to FIG. 10, a schematic diagram showing a hardware structure of the micro-control unit 260 provided by an embodiment of the present invention includes:

one or more processors 261 and a memory 262, wherein one processor 261 is taken as an example in FIG. 10.

The processor 261 and the memory 262 may be connected through a bus or otherwise, as exemplified in FIG. 10 as a bus connection.

The memory 262 serves as a non-volatile computer-readable storage medium for storing non-volatile software programs, non-volatile computer-executable programs, and modules, such as program instructions corresponding to the method for interface communication and modules corresponding to the apparatus for interface communication (e.g., the acquisition module 10, the determination module 20, and the establishment module 30, etc.) in the above-described embodiments of the present invention. The processor 261, by running non-volatile software programs, instructions and modules stored in the memory 262, executes various functional applications of a method for interface communication and data processing, i.e., functions implementing the method for interface communication of the above-described the method embodiments and the various modules of the above-described product embodiments.

The memory 262 can include a program partition and a data partition, wherein the program partition can store an operating system and an application program required by at least one function; the data partition can store, among other things, data created according to the use of an apparatus for interface communication.

In addition, the memory 262 can include a high-speed random access memory and can also include a non-volatile memory, such as at least one magnetic disk storage device, a flash memory device, or other non-volatile solid-state storage devices. In some embodiments, the memory 262 may optionally include memories remotely located with respect to the processor 261, which may be connected to processor 261 through a network. Examples of such a network include, but are not limited to, the Internet, intranets, local area networks, mobile communication networks, and combinations thereof.

The program instructions and one or more modules stored in the memory 262, when executed by the one or more processors 261, perform the steps of the method for interface communication in any of the embodiments of the method described above, or implement the functions of the modules of the apparatus for interface communication in any of the product embodiments described above.

The above-mentioned product can perform the method provided by the above-mentioned embodiment of the present invention and has functional modules and advantageous effects corresponding to the method performed. Details of techniques not described in detail in this embodiment can be found in the method provided by the above embodiments of the invention.

Embodiments of the present invention also provide a non-volatile computer-readable storage medium having stored thereon computer-executable instructions executable by one or more processors, such as the processor 261 in FIG. 10, to cause a computer to perform the steps of the method for interface communication in any of the method embodiments described above or to implement the functions of the modules of the apparatus for interface communication in any of the product embodiments described above.

Embodiments of the present invention also provide a computer program product including a computer program stored on a non-volatile computer-readable storage medium, the computer program including program instructions executable by one or more processors, such as the processor 261 in FIG. 10, to cause a computer to perform the steps of the method for interface communication in any of the method embodiments described above or to implement the functions of the modules of the apparatus for interface communication in any of the product embodiments described above.

The product embodiments described above are merely schematic, wherein the modules illustrated as separate components may be physically separated or not, and the components shown as modules may be physical units or not, i.e., they can be located in one place or distributed over a plurality of network elements. Some or all of the modules may be selected to achieve the object of the embodiments as appropriate.

From the above description of the embodiments, it will be clear to a person skilled in the art that the embodiments may be implemented by means of software plus a general purpose hardware platform, and also possibly by means of hardware. It will be appreciated by those of ordinary skill in the art that all or a portion of the process for implementing the method of the embodiments described above can be implemented by hardware associated with computer program instructions, where the computer program can be stored in a computer-readable storage medium and can include the process for implementing various methods described above. The storage medium may be a magnetic disk, an optical disk, a Read-Only Memory (ROM) or a Random Access Memory (RAM), etc.

The above description is only exemplary of the present invention, and is not intended to limit the scope of the present invention. Any equivalent structure or equivalent process transformation made on the basis of the description and the drawings of the present invention, or directly or indirectly applied to other related technical fields, are similarly included in the scope of patent protection of the present invention.

Finally, it should be noted that the above embodiments are only intended to illustrate the technical solutions of the present invention, instead of limiting the same; in the concept of the present invention, the technical features in the above embodiments or different embodiments can also be combined, the steps may be carried out in any order, and many other variations of the different aspects of the invention as described above are possible, which are not provided in detail for the sake of brevity; although the invention has been described in detail with reference to the above embodiments, those of ordinary skill in the art should understand that it is still possible to modify the technical solutions recorded in the foregoing embodiments, or to made equivalent substitutions to some of the technical features; these modifications or substitutions will not result in a departure of the essence of the corresponding technical solution from the technical solutions of the embodiments of the present invention.

The invention claimed is:

1. An interface circuit, comprising a USB HOST interface, a USB SLAVE interface, an HDMI interface, a first conversion unit, a second conversion unit, and a micro-control unit, wherein
   output interfaces of the micro-control unit are connected to an input terminal of the first conversion unit and an input terminal of the second conversion unit, respectively, an output terminal of the first conversion unit is connected to the USB HOST interface and the USB SLAVE interface, respectively, and an output terminal of the second conversion unit is connected to the HDMI interface;
   the micro-control unit is configured to control the first conversion unit to be set in a HOST mode when receiving a trigger signal from the USB HOST interface so as to establish communication between the micro-control unit and the USB HOST interface;
   the micro-control unit is further configured to control the first conversion unit to be set in a SLAVE mode when receiving a trigger signal from the USB SLAVE interface so as to establish communication between the micro-control unit and the USB SLAVE interface; and
   the micro-control unit is further configured to control the second conversion unit to output a TMDS signal when receiving a trigger signal from the HDMI interface so as to establish communication between the micro-control unit and the HDMI interface, wherein the first conversion unit comprises a USB SWITCH, wherein the USB SWITCH comprises a power supply circuit, wherein the power supply circuit comprises a first resistor.

2. The interface circuit according to claim 1, wherein the output interfaces of the micro-control unit comprise a USB 3.1 interface, and the USB 3.1 interface includes a USB 2.0 DRD pin and a USB 3.1 DATA pin;
   the micro-control unit is connected to the input terminal of the first conversion unit through the USB 2.0 DRD pin, and when the micro-control unit receives the trigger signal from the USB HOST interface, the micro-control unit controls the USB 2.0 DRD pin to work in the HOST mode, and when the micro-control unit receives the trigger signal from the USB SLAVE interface, the micro-control unit controls the USB 2.0 DRD pin to work in the SLAVE mode;

the micro-control unit is connected to the input terminal of the second conversion unit through the USB 3.1 DATA pin, and when the micro-control unit receives the trigger signal from the HDMI interface, the micro-control unit controls the USB 3.1 DATA pin to output a DP signal to the second conversion unit.

3. The interface circuit according to claim 2, wherein an input terminal of the USB SWITCH is connected to the USB 2.0 DRD pin, and an output terminal of the USB SWITCH is connected to the USB HOST interface and the USB SLAVE interface, respectively.

4. The interface circuit according to claim 3, wherein at least two USB HOST interfaces are provided, then the first conversion unit further includes:
a USB HUB, wherein an input terminal of the USB HUB is connected to the output terminal of the USB SWITCH, and an output terminal of the USB HUB is connected to the at least two USB HOST interfaces, respectively.

5. The interface circuit according to claim 3, wherein the second conversion unit comprises a protocol converter;

an input terminal of the protocol converter is connected to the USB 3.1 DATA pin, and an output terminal of the protocol converter is connected to the HDMI interface.

6. The interface circuit according to claim 5, wherein the USB SWITCH comprises a SWITCH chip, a switch enabling circuit, and a control circuit;

a power supply terminal of the SWITCH chip is connected to the power supply circuit;

a switch enabling terminal of the SWITCH chip is connected to the switch enabling circuit through a logic inverter;

a control terminal of the SWITCH chip is connected to a terminal of the control circuit, and another terminal of the control circuit is connected to the USB 2.0 DRD pin;

a data input positive electrode and a data input negative electrode of the SWITCH chip are connected to the USB 2.0 DRD pin;

a first data output positive electrode and a first data output negative electrode of the SWITCH chip are connected to the USB HOST interface;

a second data output positive electrode and a second data output negative electrode of the SWITCH chip are connected to the USB SLAVE interface;

a ground terminal of the SWITCH chip is grounded.

7. The interface circuit according to claim 6, wherein the power supply circuit comprises a first capacitor, and a second capacitor;

a first terminal of the first resistor is connected to a voltage, and a second terminal of the first resistor is connected to a first node;

a first terminal of the first capacitor is connected to the first node, and a second terminal of the first capacitor is grounded;

a first terminal of the second capacitor is connected to the first node, and a second terminal of the second capacitor is grounded; and the first node accesses the power supply terminal of the SWITCH chip.

8. The interface circuit according to claim 6, wherein the switch enabling circuit comprises a second resistor;

a first terminal of the second resistor is connected to a logic inverter of the switch enabling terminal of the SWITCH chip, and a second terminal of the second resistor is grounded.

9. The interface circuit according to claim 6, wherein the control circuit comprises a third resistor, a fourth resistor, a fifth resistor, a sixth resistor, and a third capacitor;

a first terminal of the third resistor is connected to OTG_VBUS, and a second terminal of the third resistor is connected to a second node;

a first terminal of the fourth resistor is connected to the second node, and a second terminal of the fourth resistor is connected to a third node;

a first terminal of the fifth resistor is connected to the third node, and a second terminal of the fifth resistor is grounded;

a first terminal of the sixth resistor is connected to the third node, and a second terminal of the sixth resistor is connected to the USB 2.0 DRD pin;

a first terminal of the third capacitor is connected to the third node, and a second terminal of the third capacitor is grounded; and the second node accesses the control terminal of the SWITCH chip.

10. A method for interface communication, applied to the interface circuit according to claim 1, comprising:

acquiring a trigger signal, wherein the trigger signal is generated by plugging an external device into the interface circuit;

determining an interface to which the external device is plugged according to the trigger signal; and establishing a communication connection with the interface.

11. The method according to claim 10, wherein the interface includes: a USB HOST interface, a USB SLAVE interface, and an HDMI interface, then establishing a communication connection with the interface specifically includes:

controlling the first conversion unit to be set in a HOST mode if the interface is the USB HOST interface so as to establish a communication connection with the USB HOST interface;

controlling the first conversion unit to be set in a SLAVE mode if the interface is the USB SLAVE interface so as to establish a communication connection with the USB SLAVE interface; and controlling the second conversion unit to output a TMDS signal if the interface is the HDMI interface so as to establish a communication connection with the HDMI interface.

12. The method according to claim 11, before controlling the first conversion unit to be set in a HOST mode, further comprising:

determining whether the first conversion unit is in the SLAVE mode;

if yes, sending a first interface conversion prompt to a user, and after receiving an instruction authorizing the first interface conversion returned by the user, controlling the first conversion unit to be set in the HOST mode.

13. The method according to claim 12, before controlling the first conversion unit to be set in a SLAVE mode, further comprising:

determining whether the first conversion unit is in the HOST mode;

if yes, sending a second interface conversion prompt to a user, and after receiving an instruction authorizing the second interface conversion returned by the user, controlling the first conversion unit to be set in a SLAVE mode.

14. An apparatus for interface communication, applied to the interface circuit according to claim 1, comprising:
   an acquisition module for acquiring a trigger signal, wherein the trigger signal is generated by plugging an external device into the interface circuit;
   a determination module for determining an interface to which the external device is plugged according to the trigger signal; and
   an establishment module for establishing a communication connection with the interface.

15. The apparatus according to claim 14, wherein the interface includes: a USB HOST interface, a USB SLAVE interface, and an HDMI interface, then
   the establishment module is specifically configured to:
   control the first conversion unit to be set in a HOST mode if the interface is the USB HOST interface so as to establish a communication connection with the USB HOST interface;
   control the first conversion unit to be set in a SLAVE mode if the interface is the USB SLAVE interface so as to establish a communication connection with the USB SLAVE interface; and
   control the second conversion unit to output a TMDS signal if the interface is the HDMI interface so as to establish a communication connection with the HDMI interface.

16. The apparatus according to claim 15, wherein before controlling the first conversion unit to be set in a HOST mode, the determination module is further configured to:
   determining whether the first conversion unit is in the SLAVE mode;
   if yes, sending a first interface conversion prompt to a user, and after receiving an instruction authorizing the first interface conversion returned by the user, controlling the first conversion unit to be set in the HOST mode.

17. The apparatus according to claim 16, wherein before controlling the first conversion unit to be set in a SLAVE mode, the determination module is further configured to:
   determining whether the first conversion unit is in the HOST mode;
   if yes, sending a second interface conversion prompt to a user, and after receiving an instruction authorizing the second interface conversion returned by the user, controlling the first conversion unit to be set in a SLAVE mode.

18. A automobile diagnostic device, comprising the interface circuit according to claim 1, wherein
   the micro-control unit is configured to perform the method for interface communication according to claim 10.

19. A non-volatile computer-readable storage medium, wherein the non-volatile computer-readable storage medium stores computer-executable instructions for causing the automobile diagnostic device to perform the method for interface communication according to claim 10.

* * * * *